United States Patent
Fong

(10) Patent No.: US 10,872,157 B2
(45) Date of Patent: Dec. 22, 2020

(54) REINFORCEMENT-BASED SYSTEM AND METHOD FOR DETECTING SYSTEM VULNERABILITIES

(71) Applicant: ROYAL BANK OF CANADA, Montreal (CA)

(72) Inventor: Cory Fong, Toronto (CA)

(73) Assignee: ROYAL BANK OF CANADA, Montreal (CA)

(*) Notice: Subject to any disclaimer, the term of this patent is extended or adjusted under 35 U.S.C. 154(b) by 168 days.

(21) Appl. No.: 16/230,804

(22) Filed: Dec. 21, 2018

(65) Prior Publication Data

US 2019/0197244 A1 Jun. 27, 2019

Related U.S. Application Data

(60) Provisional application No. 62/609,549, filed on Dec. 22, 2017.

(51) Int. Cl.
*G06F 21/00* (2013.01)
*G06F 21/57* (2013.01)
*G06N 20/00* (2019.01)

(52) U.S. Cl.
CPC ........... *G06F 21/577* (2013.01); *G06N 20/00* (2019.01); *G06F 2221/033* (2013.01)

(58) Field of Classification Search
CPC .................................................. G06F 21/577
See application file for complete search history.

(56) References Cited

U.S. PATENT DOCUMENTS

| | | | | |
|---|---|---|---|---|
| 8,839,441 B2* | 9/2014 | Saxena | ........... | G06F 21/577 726/25 |
| 8,925,094 B2* | 12/2014 | Kalman | ........... | G06F 21/10 726/25 |
| 9,135,152 B2* | 9/2015 | Beskrovny | ........... | G06F 21/577 |
| 9,705,904 B1* | 7/2017 | Davis | ........... | G06N 3/0454 |
| 10,423,403 B1* | 9/2019 | Natarajan | ........... | G06K 9/344 |
| 2006/0190960 A1* | 8/2006 | Barker | ........... | H04N 21/25891 725/14 |
| 2016/0142430 A1* | 5/2016 | Brew | ........... | H04L 63/1425 726/23 |
| 2017/0339178 A1* | 11/2017 | Mahaffey | ........... | H04L 67/16 |
| 2018/0157845 A1* | 6/2018 | Mehta | ........... | G06F 21/563 |

(Continued)

FOREIGN PATENT DOCUMENTS

CN 110008710 A * 7/2019 ............. G06F 21/57

*Primary Examiner* — Josnel Jeudy
(74) *Attorney, Agent, or Firm* — Norton Rose Fulbright Canada LLP

(57) ABSTRACT

A system and method for testing system vulnerabilities are provided. The method may include: training, by a processor, a machine learning model and agent to generate a payload to test vulnerabilities in the application by: selecting one or more input data from the action space to form an action data; electronically providing the action data as an input to the application; monitoring utilization of one or more system resources in response to the action data being inputted to the application; determining a score of utilization based on a result of the monitoring; determining a corresponding reward score for the action data based on the score of utilization; and identifying one or more of the action data to form a pool of candidate data for the application.

20 Claims, 3 Drawing Sheets

(56) References Cited

U.S. PATENT DOCUMENTS

| | | | |
|---|---|---|---|
| 2018/0218155 A1* | 8/2018 | Grafi | G06F 21/568 |
| 2018/0285740 A1* | 10/2018 | Smyth | G06N 3/0454 |
| 2018/0288086 A1* | 10/2018 | Amiri | G06N 3/082 |
| 2019/0171966 A1* | 6/2019 | Rangasamy | G06F 11/1464 |
| 2019/0391891 A1* | 12/2019 | Gupta | G06N 3/0436 |
| 2020/0042703 A1* | 2/2020 | Herman Saffar | G06F 11/1435 |
| 2020/0076835 A1* | 3/2020 | Ladnai | H04L 63/1416 |
| 2020/0134447 A1* | 4/2020 | Bennett | A63F 13/245 |

* cited by examiner

REINFORCEMENT-BASED SYSTEM AND METHOD FOR DETECTING SYSTEM VULNERABILITIES

CROSS-REFERENCE

This application claims all benefits including priority of U.S. provisional application No. 62/609,549 filed on Dec. 22, 2017, the content of which is herein incorporated by reference in its entirety.

FIELD

The present disclosure generally relates to the field of detecting system vulnerabilities. More specifically, the present disclosure relates to the field of detecting system vulnerabilities using machine learning.

INTRODUCTION

Prior to system deployments, testing or simulations are routinely performed to ensure that the system, once deployed, will be robust and resistant to malicious attacks. Such testing can also be performed on a system that has already been deployed, for example by security auditors. During testing, synthetic datasets or payloads may be transmitted to the system to find potential vulnerabilities. One type of potential system vulnerability is application memory vulnerability. However, exploiting application memory vulnerabilities in x86 architecture can be time consuming in modern application stacks. Commercial products and open source solutions use either a static collection of heuristic based attacks, pseudo-random payload generation, or a combination of both to find vulnerabilities and generate synthetic payloads. These existing methods for detecting system vulnerabilities may be time-consuming and occasionally misleading.

SUMMARY

In one aspect, a system is provided for detecting vulnerabilities for a computer application, the system may include: a processor; a non-transitory computer memory storing instructions and data representing a machine learning model. The instructions when executed, may configure the processor to: use the machine learning model to generate a payload to test vulnerabilities in an application, the machine learning model being trained based on an action space comprising one or more input data, wherein a machine learning agent is configured by the processor to: select one or more input data from the action space to form an action data; electronically provide the action data as an input to the application; monitor utilization of one or more system resources in response to the action data being inputted to the application; determine a score of utilization based on a result of the monitoring; determine a corresponding reward score for the action data based on the score of utilization; and identify one or more of the action data to form a pool of candidate data for the application, wherein each of action data has a corresponding reward score over a specific threshold.

In some embodiments, the processor is further configured to iteratively update the machine learning model based on at least one of the score of utilization and the corresponding reward score.

In some embodiments, the processor is further configured to selecting one or more input data from the action space to form a vulnerability test input for the application based on the identified candidate data; and electronically providing the vulnerability test input to the application to test the application.

In some embodiments, the one or more input data may include at least one of: character data, command data and user action data.

In some embodiments, the one or more system resources may include at least one processor, memory, or register.

In some embodiments, the processor is configured to further select one or more input data from the action space to form a new action data based on one or more of the reward scores.

In some embodiments, the action data may include a text string.

In some embodiments, each application has a corresponding action space.

In some embodiments, determining the score of utilization may include: determining a base usage of the one or more system resources for the application; determining a second usage of the one or more system resources for the application with the action data; and determining the score of utilization based on the base usage and the second usage of the one or more system resources for the application.

In some embodiments, the base usage of the one or more system resources is determined based on monitoring the usage of the one or more system resources when the application is running under normal circumstances without the action data.

In some embodiments, determining the score of utilization based on the base usage and the second usage of the one or more system resources for the application comprises generating the score of utilization by comparing the second usage to the base usage of the one or more system resources.

In another aspect, a computer-implemented method for detecting vulnerabilities for a computer application is provided, the method may include: training, by a processor, a machine learning model to generate a payload to test vulnerabilities in the application, the machine learning model being trained based on an action space comprising one or more input data; and executing, by the processor, instructions to cause a machine learning agent to: select one or more input data from the action space to form an action data; electronically provide the action data as an input to the application; monitor utilization of one or more system resources in response to the action data being inputted to the application; determine a score of utilization based on a result of the monitoring; determine a corresponding reward score for the action data based on the score of utilization; and identify one or more of the action data to form a pool of candidate data for the application, wherein each of action data has a corresponding reward score over a specific threshold.

In some embodiments, the method may include iteratively updating the machine learning model based on at least one of the score of utilization and the corresponding reward score.

In some embodiments, the method may include selecting one or more input data from the action space to form a vulnerability test input for the application based on the identified candidate data; and electronically providing the vulnerability test input to the application to test the application.

In some embodiments, the one or more input data comprises at least one of: character data, command data and user action data.

In some embodiments, the one or more system resources comprises at least one processor, memory, or register.

In some embodiments, the processor is configured to further select one or more input data from the action space to form a new action data based on one or more of the reward scores.

In some embodiments, determining the score of utilization comprises: determining a base usage of the one or more system resources for the application; determining a second usage of the one or more system resources for the application with the action data; and determining the score of utilization based on the base usage and the second usage of the one or more system resources for the application.

In some embodiments, the base usage of the one or more system resources is determined based on monitoring the usage of the one or more system resources when the application is running under normal circumstances without the action data.

In some embodiments, determining the score of utilization based on the base usage and the second usage of the one or more system resources for the application comprises generating the score of utilization by comparing the second usage to the base usage of the one or more system resources.

Further aspects and details of example embodiments are set forth below.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
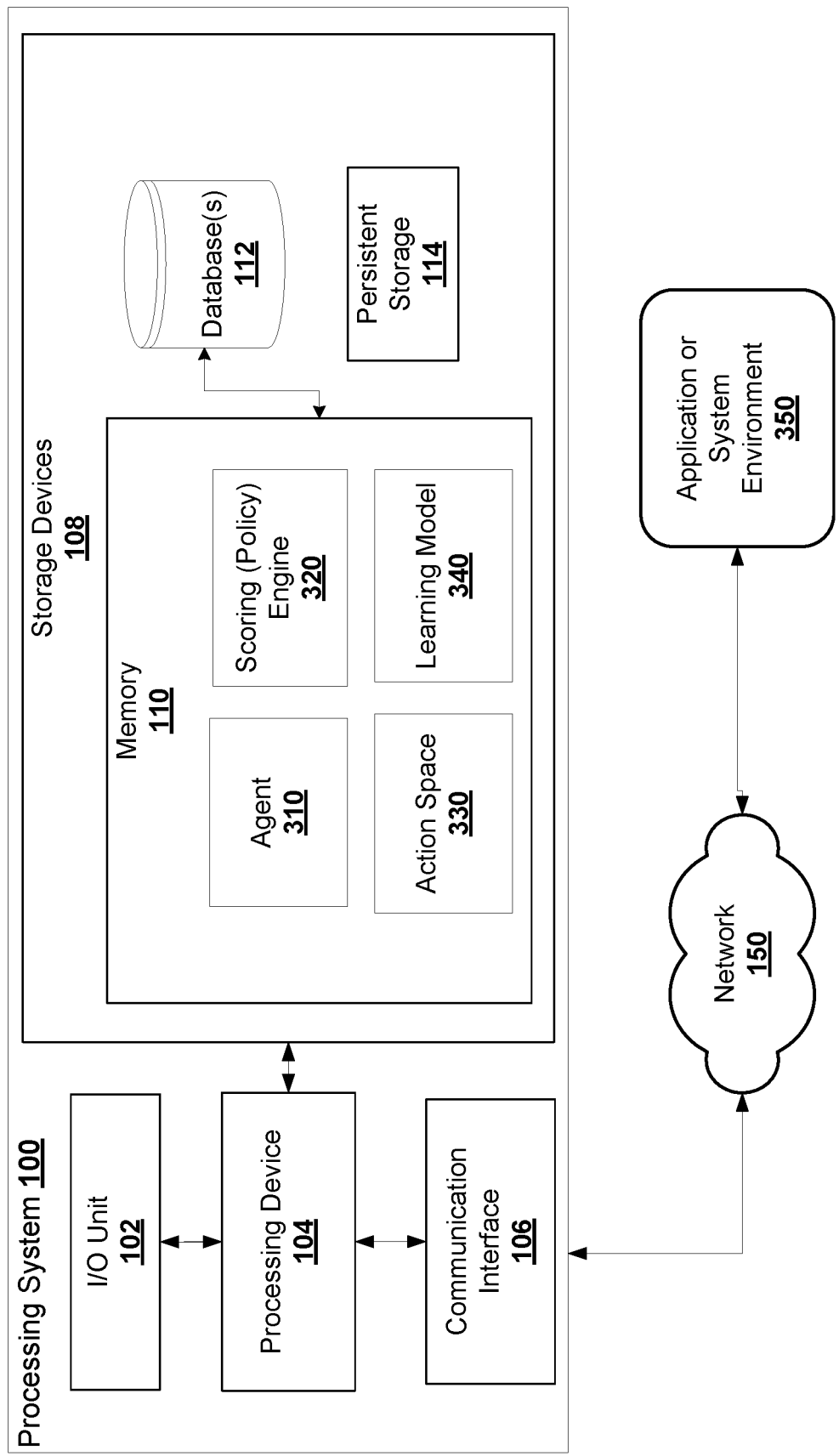
FIG. 1 is an example schematic block diagram of a system for building an action data or payload based on incremental feedback to detect system vulnerabilities according to some embodiments.

Traditional approaches to finding vulnerabilities in an application or system may include gaining full control of the application or system through occurrence(s) of memory stack or buffer overflow. For example, for applications coded on a higher level platform (e.g. C, C++), the memory stack may be managed in a relatively straightforward manner. Some applications written in other languages, such as Java, python etc.; however, have moved away from direct memory management, thereby making it more difficult to test the applications with memory attacks. In some cases, testing may involve injecting an arbitrarily large amount of data into an application, such as strings including foreign encoding characters, which may be used to exploit potential memory overflow issue of the application under test. In some cases, permutations and variations of various characters in a string may also form an input into an application to test vulnerabilities. Generally speaking, existing approaches to testing application or system vulnerabilities tend to use brute force, are resource and time consuming, and potentially provide limited test coverage.

There are several approaches to finding system or application vulnerabilities: static analysis, dynamic/blackbox testing, and glassbox testing. Static analysis generally requires a person to look at programming code and pointing out problems thereof. Blackbox testing generally requires a person to poke at the application and see what happens, with no visibility to the backend programming code. Glassbox testing generally requires a person to prepare dynamic tests using knowledge of backend programming code.

There are benefits and drawbacks associated with each testing approach listed above. For example, static analysis, which tends to be heuristic based, is fast and works well on compiled languages because the analysis includes execution of the code. However, it does not work well on interpreted languages, and issues are often missed.

Glassbox testing, which can also be heuristic based, generally provides accurate results and is faster than blackbox testing. However, it requires a manual effort to be more effective than regular blackbox testing.

Dynamic or blackbox testing, which can also be heuristic based, can uncover serious problems and can rely on very mature rules and filters for widely used applications and platforms. However, the testing process is very slow, the rules tend to be static or pattern based, and there may be false positives. Improvement of blackbox testing is desired.

Dynamic or blackbox testing can be summarized as follows:

<Payload>*→[Application]→(Output)→
"Analyze"→{Report}

<Payload>* tends to be static, and there can be thousands of permutations for a single probe. Collections of payloads make up "rulesets", which may be made from known attack vectors.

At the Output/Analyze stage, one looks for patterns in the Output that indicate the a payload has done a proper job in exploiting a vulnerability.

Testing a system or application with collection of payloads using the blackbox testing method may appear to be a "brute force" approach. However, not every single payload or rule needs to be tested—only the appropriate ones. That is, in order to be more efficient with using computing resources to test a system or platform, optimization of the set of rules and payloads that effectively compromise an application and its memory stack is desired. Such optimization may be achieved through training or reinforcement learning to recognize and build appropriate rulesets and payloads.

A developer may use the system disclosed herein to generate and fine tune a test suite for a particular application. The system may be run for each application under development or testing. An action space may be defined for each application. The system may be configured to generate a test suite containing payloads or action data designed to crash or cause a system to slow down, this way, time and computing resources may be saved, since the machine learning agent iteratively updates the machine learning model to generate action data based on incremental feedback of the system and computer application.

In some embodiments, payload may be referred to as action data, which may include one or more input data from an action space. The input data may include characters, strings, user action such as mouse clicks and user commands. An action data may in some embodiments be a text string.

Embodiments described herein generally relate to using an Asynchronous Advantage Actor-Critic (A3C) reinforcement learning algorithm to help build a payload based on how a system reacts to other synthetically created payloads.

Generally speaking, a payload includes data that is transmitted to a system. The payload may exclude headers or metadata sent solely to facilitate payload delivery.

Secure memory management may be a difficult but important requirement in application development. Memory management is often overlooked. Mismanagement of memory may lead to exploitation of vulnerabilities in memory such as buffer/stack overflow.

For instance, one example is "overflowing" instructions in a memory register into the next address space. Locating these types of vulnerabilities often requires finding the nuances of how an entire stack manages its memory; traditionally this has been done via trial-and-error. Application stacks as a whole can have very unique ways in cleaning up and utilizing memory.

Utilizing previously successful payloads on similar application stacks and making random permutations to those payloads may allow testers and security auditors stumble on these vulnerabilities, but the approach used in the computing industry is still largely a randomized "shotgun" approach to the problem.

Embodiments described herein provide a system and method for an reinforced learning model, implemented through a machine learning agent, to generate effective payloads to test vulnerabilities in an application, the learning model being trained by the agent based on an action space comprising one or more payload data, and on one or more policies set in an environment, which are described in detail below.

In some embodiments, a payload or action data may include one or more bits of data that are used as input to an application or system. For example, a payload may contain a string comprising one or more unicode characters. In some embodiments, a payload or action data may include information representing an user action such as a clicking of a button or window, or any other forms of user action. In some embodiments, a payload or action data may include both input data and user action data. A payload may also be referred to as a rule in the context of machine learning classification.

An action space may be defined as a pool of available characters, data and other types of information that can be used to form part or all of a payload (or rule). That is, a machine learning agent may select one or more input from the action space to construct one or more payloads for testing an application, system, or an environment. For example, action space may include language keywords, escape characters, special characters, foreign encoding characters and so on.

In the context of machine learning and in particular reinforcement learning, a policy may be defined as a payload (which may be data, action or a combination of both) to take in each environment (e.g. an application or system), so as to maximize some function (e.g. to maximize a positive reward). Specifically, a policy may be a payload, a set of actions or data associated with a weight representing a likelihood of success or reward, such as a string of five characters with a likelihood of success if crashing an application. The success or reward may be weighed and predefined. For example, a heavily weighed success (or a high positive reward) may be a complete crash of an application, whereas a moderately weighed success (or a moderate positive reward) or be a spike in processor (e.g. CPU) resources, and a lightly weighed success (or a low positive reward) may be a slow-down of an application. A negative reward may be a lack of spike in processor usage.

In some embodiments, one or more input data in the action space include at least one of: character data, command data and user action data.

In some embodiments, the one or more system resources comprises at least one processor, memory, or register.

In some embodiments, the processor is configured to further select one or more input data from the action space to form a new action data based on one or more of the reward scores.

In some embodiments, each application has a corresponding action space.

For example, to construct a payload, firstly, existing rules may be used to train a model for different attack types. For example, existing rules may include existing payload data that are known as malicious actions, i.e., data known to cause system crashes when used as an input to the system. Then, pieces of the existing payload data that are known as malicious actions may be broken apart to construct an action space (i.e. language keywords, escape characters, special characters). Then, a training model using reinforcement learning algorithm may be leveraged to generate policy and the policy may be classified on a trained model by a machine learning agent as further described in detail below. Lastly, the generated policy may be scored, and the score may be fed back to the training model in order to improve payload construction until it hits an acceptable confidence (e.g. a score of 98+ out of 100).

In some embodiments, system and methods disclosed herein may use machine learning with application of Bayesian inference to the construction of a payload in the form of reinforcement learning.

The general idea of reinforcement learning is to reward positive or wanted behaviour, while penalizing negative or unwanted behaviour. Over time, an agent would be able to indicate whether a payload or a set of actions would likely produce a positive or negative outcome. Two classes of problems may be addressable by reinforcement learning: problems that provide binary feedback and problems that can provide incremental feedback.

Binary feedback problems provide no level of granularity to the agent beyond "positive" or "negative" feedback. An example of this in the context of security is checking whether an application is vulnerable to a specific kind of exploit; one would simply test the probe and it is either vulnerable or it isn't. There is no degree of vulnerability. These types of problems are often difficult for a reinforcement learning algorithm to solve because there is no incremental convergence to a solution. In this case, the path to an optimal solution becomes as difficult as observing the result of random actions.

Finding a memory based exploits is a difficult task because the main indication of a successful payload is one that crashes the application. Further, to utilize the application fault, one needs to tweak the payload to overflow into a useful register to execute the desired instruction.

In some embodiments, a system may monitor the effect of a payload on the system resources and memory registers rather than the overall effect of the payload on the application.

Payloads generated by existing tools may employ a pseudo-random approach, which may take a long time to generate an effective payloads. In some embodiments, a system may be configured to utilize metrics from various system and resource monitors in a reinforcement learning paradigm to provide incremental feedback, which may allow for the learning algorithm to converge on an optimal policy. The system may be configured to discover one or more permutations or sets of permutations of input that may result in an incremental increase of memory usage or CPU usage, which may lead to a state that can be exploited; such a state may represent a system memory vulnerability. The incremental increase of memory or CPU usage may, in some embodiments, occur in aggressive management of unusual utilization of memory.

Referring now to FIG. 1, which shows an example schematic block diagram of system 100 for building a payload based on incremental feedback to detect system vulnerabilities according to some embodiments.

System 100 includes an I/O unit 102, processing device 104, communications unit 106 and storage device 108. The storage device 108 can include databases 112, persistent storage 114, and memory 110. The system 100 can connect to data sources 120 through network 150. The memory 110 can include instructions executable by the processing device 104 to configure a machine learning agent 310, a machine learning model 340, a scoring /policy engine 320, and an action space data store 330. In some embodiments, action space data store 330 may be stored on database 112.

The machine learning agent 310 may send and receive data from environment 350 for training the learning model 340, as further described below.

Figure 3:
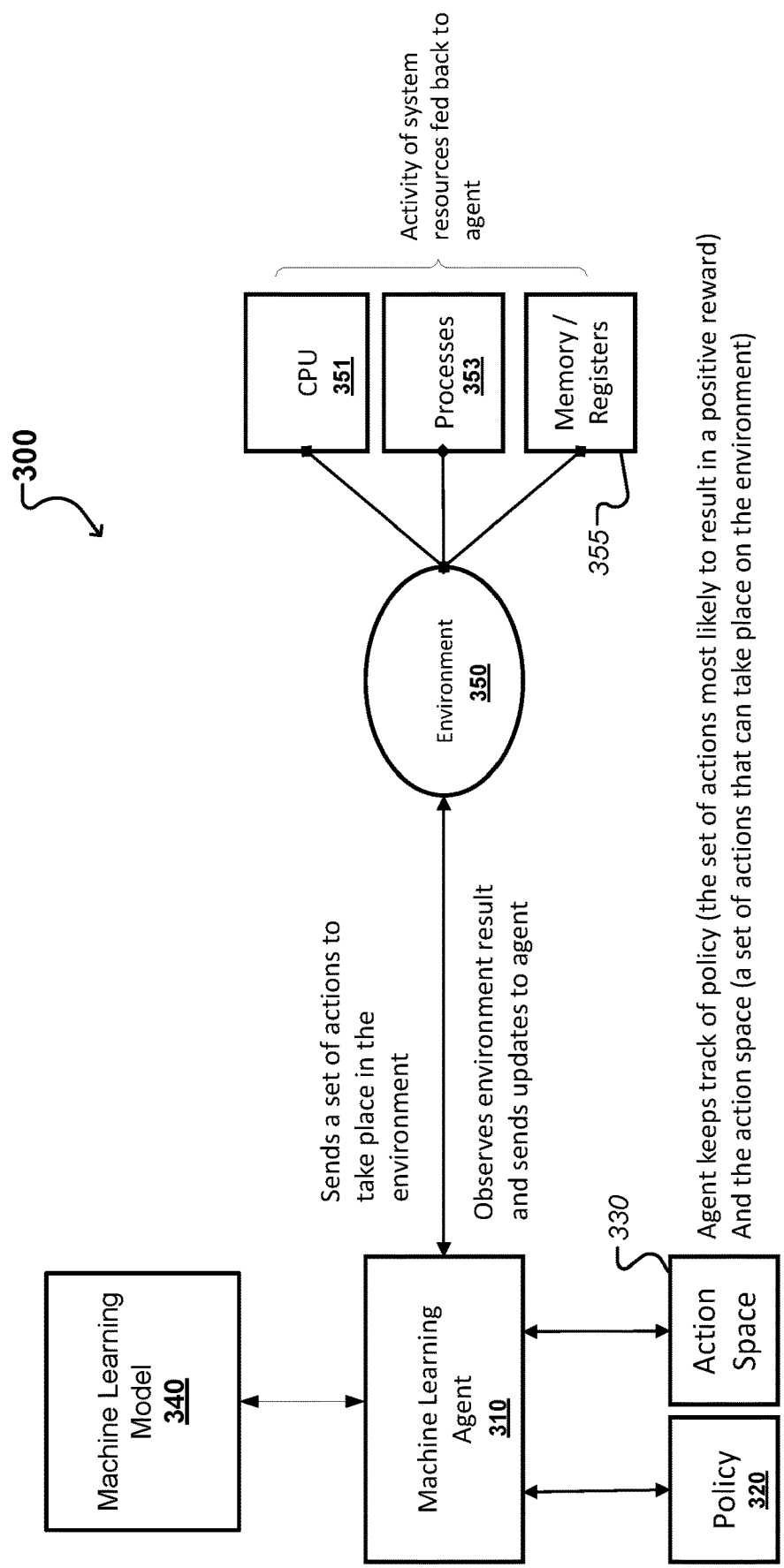
FIG. 3 is a flowchart illustrating an example process for using Asynchronous Advantage Actor-Critic (A3C) according to some embodiments.

Referring also to FIG. 3, in some embodiments, a reinforcement learning model 340 may be configured and trained by a machine learning agent 310. The agent 310 may initially define an action space 330, success or reward levels, and keep track of one or more policies which may be set by a scoring engine 320. An environment 350 may be an application, a platform, a system, or a set of applications. The agent 310 may be configured to provide payloads (e.g. a set of actions) to the environment 350, some times through a network 150, and to monitor various components or resources, such as CPU 351, processes 353, and memory buffer or registers 355 of the environment 350.

An action space 330 may be defined based on a problem, such as a problem of how to crash a system or application. The action space 330 (i.e., a pool of possible inputs and/or actions) may be defined based on activities exploring the problem. One type of activity may be fuzz testing, which can involve sending a large amount of random data ("fuzz") to a system or application in an attempt to make the application crash. For the purposes of fuzz testing, an example payload may include random input characters in various encodings which makes the action space seemingly large, but finite.

The agent 310 may be configured to find permutations of input (e.g. payloads) from the action space 330 that will utilize system resources (e.g. memory) in a way to most likely crash the application or system. Not every application crash will result in a newly discovered exploit, but every payload that causes a crash can be used to derive effective singular input or sets of input that could be exploitable.

The monitored environment 350 may return an outcome to the agent 310 specific to the submitted payload. In some embodiments, the agent 310 may be configured to monitor the environment 350 and detect current values of one or more parameters representing a state of one or more components of the environment, such as CPU 351, processes 353, and memory buffer or registers 355. The current values of the one or more parameters may inform the outcome returned to agent 310. For example, data representing different states of a memory register may indicate the memory register may be: empty; having a set of instructions within; or having instruction code that is pushed outside of bounds of the memory registered allocated to the particular application space. Any of these states may be an indication of high or low reward for a payload.

Setting the appropriate reward for "positive" and "negative" system resource usage may be difficult. Therefore, in some embodiments, a training or reward calibration may be prefaced with a profiling exercise of the application being exploited with a normal or "benign" input. Once the "normal" behaviour is identified, the agent 310 may be configured to isolate the input and baseline rewards that cause the resource to move out of this "normal" range abnormally. Generally, the rewards can be set as positive when there is an abnormal amount of system resources consumed (e.g. CPU or memory usage). In particular, a high positive reward may be returned if the environment or application crashes.

Once the baseline and an appropriate reward system has been established, the learning model 340 may be trained to "learn" about effective payloads against a specific application environment. Because of the size of the action space 330, finding an effective payload can take hours or days.

The agent 310 may be configured to classify the outcome as a level of reward (e.g. high positive or low positive) and attach the level of reward to the payload to classify a policy, and then re-determine which payload from the action space to feed into the environment next in order to maximize the reward. Scoring engine 320 may be configured to analyze all the policies, each associated with a respective reward level, and to generate or update machine learning (ML) rules in the learning model 340 for generating payloads with maximum rewards based on the analysis. The ML rules may be iteratively refined in each cycle in order to construct more effective payloads (i.e., payloads likely to cause high positive rewards) from the action space. Once a pre-determined threshold of positive rewards and policies have been found, the agent 310 may determine that the learning or training is now complete and may be configured to generate one or more policies that are associated with high positive reward to test the system.

The processing device 104 may be, for example, any type of general-purpose microprocessor or microcontroller, a digital signal processing (DSP) processor, an integrated circuit, a field programmable gate array (FPGA), a reconfigurable processor, or any combination thereof.

The storage device 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O unit 102 enables system 100 to interconnect with one or more input devices, such as a keyboard, mouse, camera, touch screen and a microphone, or with one or more output devices such as a display screen and a speaker.

The communications unit 106 enables system 100 to communicate with other components, to exchange data with other components, to access and connect to network resources, to serve applications, and perform other computing applications by connecting to a network (or multiple networks) capable of carrying data.

The system 100 is operable to register and authenticate user (using a login, unique identifier, and password for example) prior to providing access to applications, a local network, network resources, other networks and network security devices.

The system 100 connects to other components in various ways including directly coupled and indirectly coupled via the network. Network 150 (or multiple networks) is capable of carrying data and can involve wired connections, wireless connections, or a combination thereof. Network 150 may involve different network communication technologies, standards and protocols, such as for example.

Figure 2:
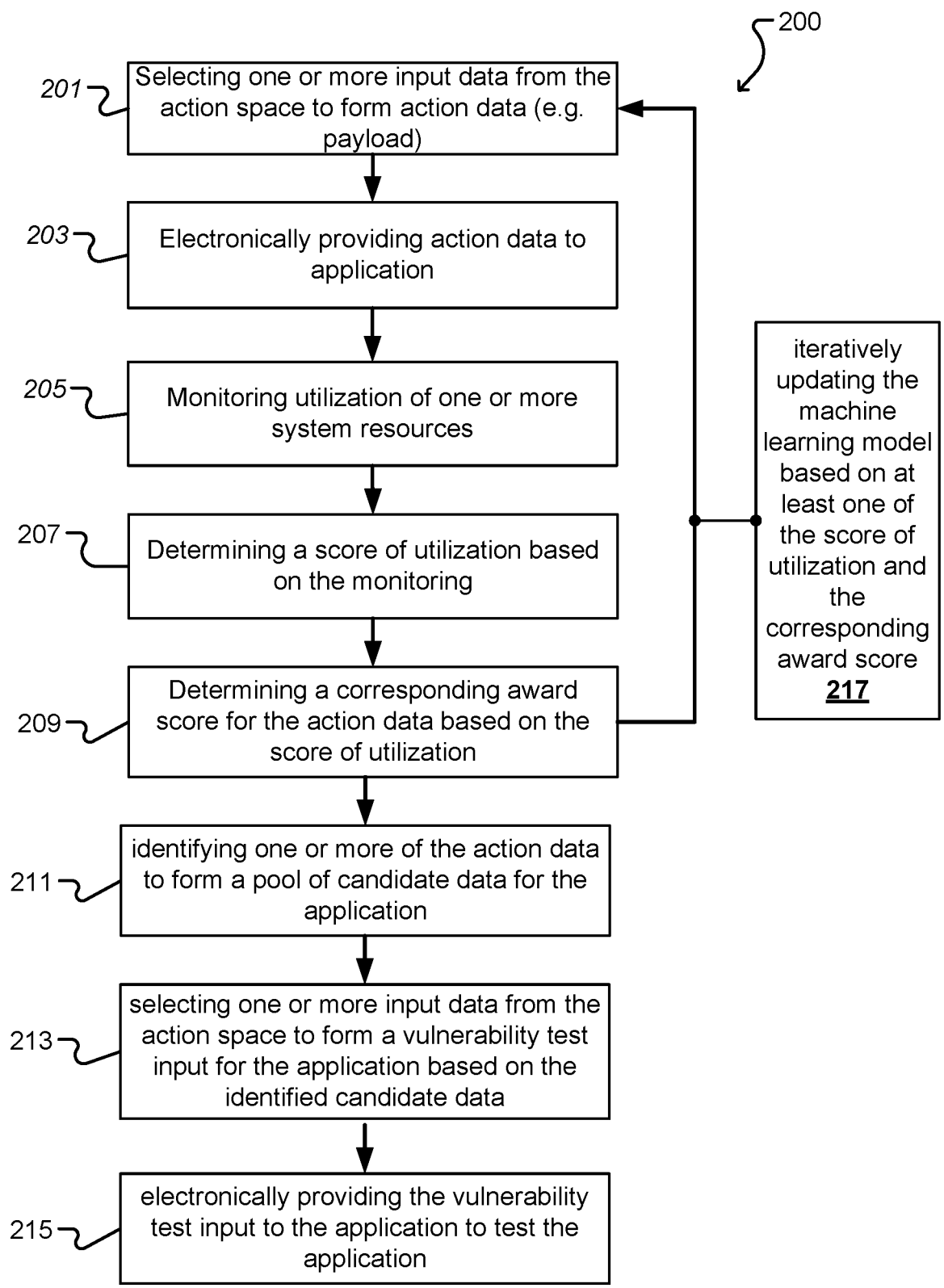
FIG. 2 is an example flowchart illustrating an example process for building an action data or payload based on incremental feedback according to some embodiments.

Referring now to FIG. 2, which is a flowchart illustrating an example process 200 for building an action data or payload based on incremental feedback according to some embodiments. At step 201, one or more input data from the action space may be selected to form an action data (also known as "payload"), for example, a payload may be set to an arbitrary input, which may be formed by input data selected randomly, in the action space in the beginning of a training process of a learning model, or may be intelligently selected based on existing policies; at step 203, the action data is provided as an input to the application, which may be electronically transmitted to the application. At step 205, utilization of system resources such CPU, Memory and Register utilization is monitored; at step 207, a score of utilization is returned to the agent based on the monitoring of the system resources; in some embodiments, the score may be aggregated score combining a plurality of scores, each score corresponding to a monitored system resource. At step 209, a corresponding reward score for the action data is determined based on the score of utilization.

At step 211, one or more of the action data may be identified to form a pool of candidate data for the application, wherein each of action data has a corresponding reward score over a specific threshold. The threshold may be pre-determined. For example, if the threshold is set to be 5, and the reward score for an action data is 3, then the action data may not be identified as a candidate data for the application. On the contrary, if the reward score is 5 or above, then the action data may be identified as a candidate data for the application. A candidate data may mean an action data (e.g. payload) that is likely to trigger a system or application vulnerability, such as consuming a lot of system resources, or causing a crash of the application or system.

At step 213, one or more input data from the action space may be selected to form a vulnerability test input for the application based on the identified candidate data. The machine learning agent 310 may be configured to select new payload from the pool of candidate, and the new payload may be used, at step 215, as a vulnerability test input for the application, in order to test the application and provide further suggestions as to how to improve the application against possible attacks.

In some embodiments, at step 217, the machine learning model may be iteratively updated based on at least one of the score of utilization and the corresponding reward score. For example, the model may receive a high reward score for a particular action data, and learn to recognize one or more input data within the particular action data that is likely to yield a high reward score. The model may associate the high reward score with one or more input data in the action data with a high reward score. The reward score may have to meet a specific threshold (e.g. 6 out of 10) before it is considered sufficient for the model to be updated.

A reward score may be defined and updated by the machine learning agent 310. For example, if any system resource being monitored has a score of utilization that meets a predefined threshold, a positive reward of +1 may be determined by the agent. If the application process ends during the test (signaling an error in handling the application), a positive reward of +3 may be determined by the agent. Otherwise, a reward of 0 is tracked in the agent (to show that it was tested, but not effective).

In some embodiments, determining the score of utilization may include: determining a base usage of the one or more system resources for the application; determining a second usage of the one or more system resources for the application with the action data; and determining the score of utilization based on the base usage and the second usage of the one or more system resources for the application.

In some embodiments, the base usage of the one or more system resources is determined based on monitoring the usage of the one or more system resources when the application is running under normal circumstances without the action data. For example, a base usage of a CPU may be the usage of the CPU when the application in question is started normally without the action data being inputted. Alternatively, a base usage of a CPU may be the usage of the CPU when the application is started with an input that is known not to cause any issues with the application.

A second usage of a system resource may be the usage of the system resource when the action data is sent to the application in question as an input. For example a CPU may spike when the action data causes the application to use a lot of CPU resource.

In some embodiments, determining the score of utilization based on the base usage and the second usage of the one or more system resources for the application comprises generating the score of utilization by comparing the second usage to the base usage of the one or more system resources.

In some embodiments, instructions written in Python™ may be implemented to monitor one or more system resources. For example: 'platform' module used to gather information about OS, version, processors (python standard module); 'psutil' module used for a list of threads and processes on a system (code.google.com/p/psutil); 'os' module used for a backup list of threads and processes (python standard module); 'pysizer' module used to gather memory usage information (pysizer.8325.org); and 'winreg' module used to gather registry activity (on windows) (python standard module).

In some embodiments, system resources that are monitored (e.g. on a MSI GS63 laptop) may be:
CPU. Intel Core i7-7700HQ
GPU. NVIDIA GeForce GTX 1060 (4GB GDDR5)
HDD/SSD. 1 TB SSD+1 TB HDD, 7200 rpm.
RAM. 16 GB DDR4, 2400 MHz
Windows 10 Build 10586.1177

In some embodiments, experiments were run with minimal default services off fresh windows install from build 10586.1177, and example thresholds for various system resources may be determined by profiling benign application usage.

For example, for Microsoft Word 2010, CPU threshold for a positive reward may be set to 45%. In some embodiments, the threshold may be set to a different value, such as 60%, or 50%, both may yield much slower learning rates, equivalent or worse than traditional fuzz testing approach. In some embodiments, threshold of 40% may trigger false positives as the application may be resource intensive on startup due to application update/license check/plugin checks that occur.

For example, a threshold for a RAM paged pool usage for positive reward may be set to 60% to 62%. This metric is heavily dependent on the amount of RAM installed, the cleanup process after the OS boots up and what has been run. Note that 62% may be representative of 10 GB/16 GB usage and could potentially change in a system with larger/smaller amounts of RAM installed.

For example, registry activity fault count of a non-zero, may be set as a threshold for a register resource.

In some embodiments, concerning a browser application such as Chrome with no plugins installed, CPU threshold for positive reward may be set to 60% (below this yielded constant positive rewards, which was not representative of 'malicious' payloads). RAM paged pool usage for positive reward may be set to 26%, and registry threshold may be set to a activity fault count of non-zero.

In some embodiments, concerning a computer application such as Putty: CPU threshold for positive reward may be set to 25%; RAM Paged Pool usage for positive reward may be set to 10%, and registry threshold may be set to a activity fault count of non-zero.

In some embodiments, the machine learning model may be a model based on Asynchronous Advantage Actor-Critic (A3C) model.

The approach for training of a A3C model may be similar to Generative Adversarial Networks (GAN) with the differentiating factor being a single model training against observations of an environment. The A3C approach may be unique in terms of the observation of system resources in this context and the inferences made to train the model.

An issue that may be countered by training of an A3C model is mode collapse, or bias of a specific approach. Although rare due to the high entropy of the action space, the policy generated has a slight chance of finding a "high reward" input or set of inputs early in its training and ceasing "exploration" of the rest of the action space due to how poorly the rewards observed are of other input. This issue may be solved by either restarting the training in hopes of the policy not converging on the same input too early, or less randomly by temporarily removing the high reward input from the action space and revisiting the input once the model has sufficiently matured.

To exercise this approach, several "normal" applications in heavy use are selected:

Microsoft Word 2010

Sublime Text 3 (Build 3126)

Putty 0.67

Chrome v 61.0.3163.100

One or more open source tools may be effective in finding system vulnerabilities, such as American fuzzy lop and Radamsa.

In some embodiments, a learning model based on A3C may be effective in finding system vulnerabilities as well.

TABLE 1

Microsoft Word 2010

| Tool | Errors found | Effective Errors | Lower Bound (hh:mm) | Upper Bound (hh:mm) |
|---|---|---|---|---|
| American fuzzy lop | 23 | 9 | 20 h 13 m | 73 h 29 m |
| Radamsa | 6 | 1 | 23 h 40 m | 56 h 1 m |
| A3C | 20 | 11 | 18 h 15 m | 76 h 12 m |

TABLE 2

Sublime Text 3

| Tool | Errors found | Effective Errors | Lower Bound (hh:mm) | Upper Bound (hh:mm) |
|---|---|---|---|---|
| American fuzzy lop | 5 | 1 | 44 h 13 m | 106 h 2 m |
| Radamsa | 3 | 0 | 37 h 17 m | 80 h 6 m |
| A3C | 8 | 1 | 36 h 9 m | 81 h 52 m |

TABLE 3

Putty

| Tool | Errors found | Effective Errors | Lower Bound (hh:mm) | Upper Bound (hh:mm) |
|---|---|---|---|---|
| American fuzzy lop | 14 | 11 | 6 h 55 m | 57 h 59 m |
| Radamsa | 13 | 8 | 15 h 45 m | 44 h 7 m |
| A3C | 11 | 11 | 6 h 18 m | 45 h 18 m |

TABLE 4

Chrome

| Tool | Errors found | Effective Errors | Lower Bound (hh:mm) | Upper Bound (hh:mm) |
|---|---|---|---|---|
| American fuzzy lop | 6 | 0 | 66 h 9 m | 91 h 12 m |
| Radamsa | 8 | 1 | 35 h 0 m | 82 h 8 m |
| A3C | 6 | 3 | 2 h 15 m | 41 h 37 m |

The "Errors Found" show the number of times the tool was able to induce an application crash, while an "Effective error" was one that could be exploited. The "Lower Bound" was the minimum amount of time it took to induce an error, and similar for the "Upper Bound".

An analysis of the results shows that the A3C approach is as effective as leading open source tools such as American fuzzy lop and Radamsa. While not always identifying the same number of errors as other tools, it was always able to find the same number or more of effective errors to exploit. A look at the lower bound of the runtime of the model training also shows that the A3C approach tends to find exploits faster overall.

The average time of each approach for the sample applications were all within 15% of the lower bound of the reported times, with the exception of Chrome and American fuzzy lop, whose average time was approximately 90 h for each error found.

The A3C approach shows that it can be as effective, and in some cases more effective than leading open source tools such as American fuzzy lop and Radamsa in finding real issues in a reduced amount of time. As the nature of this type of testing is a strenuous one due to the amount of time it takes, reducing any overhead would be a desired improvement.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the disclosure, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

What is claimed is:

1. A system for detecting vulnerabilities for a computer application, the system comprising:
   a processor;
   a non-transitory computer memory storing instructions and data representing a machine learning model, wherein the instructions when executed, configures the processor to:
   use the machine learning model to generate a payload to test vulnerabilities in an application, the machine learning model being trained based on an action space comprising one or more input data, wherein a machine learning agent is configured by the processor to:
   select one or more input data from the action space to form an action data;
   electronically provide the action data as an input to the application;
   monitor utilization of one or more system resources in response to the action data being inputted to the application;
   determine a score of utilization based on a result of the monitoring;
   determine a corresponding reward score for the action data based on the score of utilization; and
   identify one or more of the action data to form a pool of candidate data for the application, wherein each of action data has a corresponding reward score over a specific threshold.

2. The system of claim 1, wherein the processor is configured to iteratively update the machine learning model based on at least one of the score of utilization and the corresponding reward score.

3. The system of claim 1, wherein the processor is configured to:
   select one or more input data from the action space to form a vulnerability test input for the application based on the identified candidate data; and
   electronically provide the vulnerability test input to the application to test the application.

4. The system of claim 1, wherein the one or more input data comprises at least one of:
   character data, command data and user action data.

5. The system of claim 1, wherein the one or more system resources comprises at least one processor, memory, or register.

6. The system of claim 1, wherein the processor is configured to further select one or more input data from the action space to form a new action data based on one or more of the reward scores.

7. The system of claim 4, wherein the action data comprises a text string.

8. The system of claim 1, wherein each application has a corresponding action space.

9. The system of claim 1, wherein determining the score of utilization comprises:
   determining a base usage of the one or more system resources for the application;
   determining a second usage of the one or more system resources for the application with the action data; and
   determining the score of utilization based on the base usage and the second usage of the one or more system resources for the application.

10. The system of claim 9, wherein the base usage of the one or more system resources is determined based on monitoring the usage of the one or more system resources when the application is running under normal circumstances without the action data.

11. The system of claim 9, wherein determining the score of utilization based on the base usage and the second usage of the one or more system resources for the application comprises generating the score of utilization by comparing the second usage to the base usage of the one or more system resources.

12. A computer-implemented method for detecting vulnerabilities for a computer application, the method comprising:
- training, by a processor, a machine learning model to generate a payload to test vulnerabilities in the application, the machine learning model being trained based on an action space comprising one or more input data; and
- executing, by the processor, instructions to cause a machine learning agent to:
  - select one or more input data from the action space to form an action data;
  - electronically provide the action data as an input to the application;
  - monitor utilization of one or more system resources in response to the action data being inputted to the application;
  - determine a score of utilization based on a result of the monitoring;
  - determine a corresponding reward score for the action data based on the score of utilization; and
  - identify one or more of the action data to form a pool of candidate data for the application, wherein each of action data has a corresponding reward score over a specific threshold.

13. The method of claim 12, comprising iteratively updating the machine learning model based on at least one of the score of utilization and the corresponding reward score.

14. The method of claim 12, comprising:
- selecting one or more input data from the action space to form a vulnerability test input for the application based on the identified candidate data; and
- electronically providing the vulnerability test input to the application to test the application.

15. The method of claim 12, wherein the one or more input data comprises at least one of:
- character data, command data and user action data.

16. The method of claim 12, wherein the one or more system resources comprises at least one processor, memory, or register.

17. The method of claim 12, wherein the processor is configured to further select one or more input data from the action space to form a new action data based on one or more of the reward scores.

18. The method of claim 12, wherein determining the score of utilization comprises:
- determining a base usage of the one or more system resources for the application;
- determining a second usage of the one or more system resources for the application with the action data; and
- determining the score of utilization based on the base usage and the second usage of the one or more system resources for the application.

19. The method of claim 18, wherein the base usage of the one or more system resources is determined based on monitoring the usage of the one or more system resources when the application is running under normal circumstances without the action data.

20. The method of claim 18, wherein determining the score of utilization based on the base usage and the second usage of the one or more system resources for the application comprises generating the score of utilization by comparing the second usage to the base usage of the one or more system resources.

* * * * *